Nov. 28, 1950 — C. L. BEST — 2,531,604
PORTABLE SELF-FEED DRILL
Filed Nov. 12, 1948 — 2 Sheets-Sheet 1

INVENTOR.
CARL L. BEST,
BY [signature]

Nov. 28, 1950  C. L. BEST  2,531,604
PORTABLE SELF-FEED DRILL
Filed Nov. 12, 1948  2 Sheets-Sheet 2
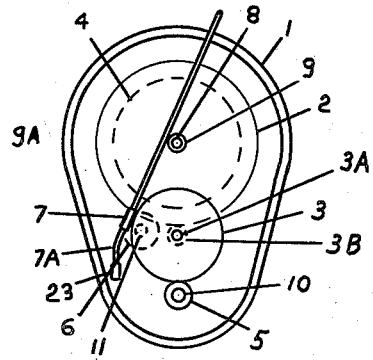
Fig. 2
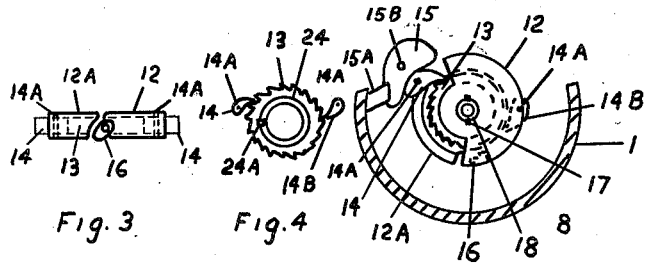
Fig. 3  Fig. 4  Fig. 5
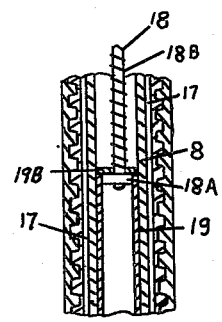
Fig. 6
Fig. 7
Fig. 8
INVENTOR.
CARL L. BEST,
BY David V Eckroad
Attorney.

Patented Nov. 28, 1950

2,531,604

UNITED STATES PATENT OFFICE 2,531,604

PORTABLE SELF-FEED DRILL

Carl L. Best, Cleveland, Ohio

Application November 12, 1948, Serial No. 60,522

5 Claims. (Cl. 77—34.7)

My invention relates to a new and useful improvement in a portable self-feed drill, the objects of my improvements are: first, to provide means to actuate a lever throw cooperating with a clutch incorporated in a gear train by means of which an "idle gear" is brought into operation with a gear fast on the guiding sleeve 24 of the drill chuck carrying member 29 by means of which the speed ratio of the gears are increased, hence the rotation of the guiding sleeve, in access to that of the speed ratio of the gear members which advance the drill chuck carrying member downwardly, with the result that the drill chuck carrying member is returned to its initial position; second, to provide a variable change of downward travel of the drill chuck carrying member, through the means of a ratchet fast on the guiding sleeve member, and intermittently advanced by pawls, or dogs, controlled by a releasing cam operatively connected to a brake band that frictionally engages the outer peripherial portion of the guiding sleeve; third, to provide means to disengage the clutch, and hence to permit the "idle gear" to again become inactive, and to permit the drill to become operative downward in the subsequent drilling operation.

Other objects attainable by the invention will become apparent from a reading of the description and a reference to the accompanying drawings, in which:

Fig. 2 is a top view of the invention.

Fig. 3 is an edge view of the assembly shown in Fig. 5.

Fig. 4 is a view of the ratchet wheel with dogs, shown in the assembly in Fig. 5.

Fig. 5 is a view of an assembly consisting of a ratchet wheel with dogs positioned on the threaded adjusted rod.

Fig. 6 is a cross sectional view of a segment of the tube assembly showing the threaded adjusting in place within the hollow tube 8, with the rod 18.

Fig. 7 is an end view of the assembly shown in Fig. 6.

Fig. 8 is a perspective view of the assembly consisting of driving gears, ratchet assembly, etc.

Describing the invention as shown in the drawings:

Figure 1:
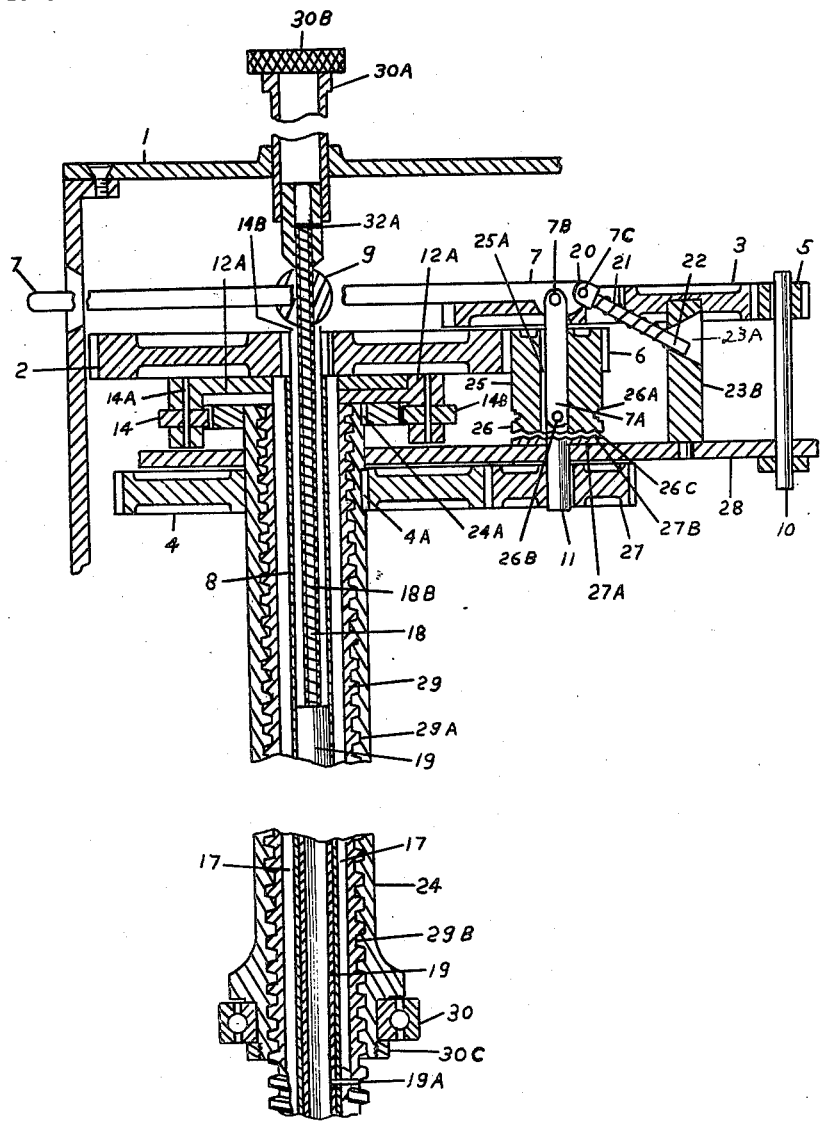
Fig. 1 is an enlarged view of the invention in vertical elevation and shown in segments.

In the construction shown in Fig. 1, the device comprises a casing 1, shown in segments, adapted for being connected to a motor (not shown) or other form of power unit.

A hollow shaft 8 has a large horizontal gear 2 keyed thereon and, partly superimposed over the gear 2, is the gear 3 fixed on the upper end of a shaft 3A. A larger gear 4 is fixed, or keyed on the upper portion of the drill chuck guiding members 24 and rotates in a horizontal plane parallel to the large gear 2. 5 is a gear fixed on the upper end of the vertical shaft 10, the power shaft, and meshes with and drives the gear 3, a smaller gear 3B is attached on the under surface of the gear 3 and meshes with the toothed periphery of gear 2 to drive same. A gear 6 is fixed on the upright shaft 11 and the gear 27 is fixed on the lower end of shaft 11, and meshes with and drives the larger gear 4, disposed between the gears 6 and 27 is a clutch assembly, the upper part 25 being joined to the gear 6 and such gear and the 25 part being slidably fixed on the shaft 11 and driven by such shaft by means of the key 25A, the lower and opposing part 27A being fixed, or joined with the gear 27 and rotating with same.

The opposing surfaces of the clutch parts 25 and 26 are provided with serrations 26C which permits the lower part 27A to drive the upper part 25 with the gear 2.

A clutch band 26A is disposed around the clutch part 25 in a groove and is attached to the vertical arm 7A by means of the rivet 26B, the clutch assembly is free to rotate within the band 26A, the vertical arm 7A is pivotally attached to the horizontal lever 7 by means of 7C. A counterbalance means is pivotally attached on the end of the lever 7 by means of the rivet 7C, such balance consisting of an extended arm 2 with rod 22, which terminates in a housing block 23B with a space 23A to permit the up and down movement of the end of 22 when operated by the lever 7, a spiral spring 21 is disposed around the rod 22 between the inner end 20 and the block 23, which tends to hold or maintain the rod in an up or down position as well as the lever 7 in its adjusted position, such lever 7 when in its "up" position causing the clutch parts to engage and when in its "down" position disengages the clutch parts. On the drill chuck guiding member 24, there is provided a ratchet wheel 13 having a plurality of teeth, see Fig. 4, the ratchet is provided with a pawl housing consisting of two sections 12 and 12A, the section 12 is keyed to the hollow drive shaft, while the section 12A is circumferentially adjustable relative thereto by means of 16, which is the means for adjusting the width of the split between such two sections, the dogs or pawls 14A and 14B are adapted to increase or retard the rotative speed of the drill chuck guiding member. 15 is a knock-out cam for the said dogs or pawls.

In the internally threaded drill chuck guiding member 24 there is provided the externally screw threaded drill chuck carrying member 29, having threads 29A, that threads thereinto. This member is hollow throughout its length, except a portion adjacent its tapered drill chuck receiving end (not shown), 29 having 19 fastened thereto by means of 19A.

The tube is concentric within the hollow driven shaft and extends upwards therein so that when the clutch is released, the upper end of the tube engages the under surface of the nut 9 upon which the lever 7 is pivotally mounted and it is forced upward just sufficient to cause the lever to press downward on its inner end and cause the clutch to engage and when such lever is in its down position the clutch releases, hence when the drilling operation begins the lever 7 is in its "up" position.

The hollow driven shaft member is held in an axial non-movable relation to the externally screw-threaded drill chuck carrying members and also the internally screw-threaded drill chuck guiding member so that on the rotation of the hollow drive shaft member the externally screwthreaded drill chuck carrying member is screwed down in the drill chuck guiding members, while at the same time the drill chuck guiding member is intermittently rotatable by the alternate release of the dogs or pawls and subsequent engagement with the ratchet.

The clutch lever extends transversely nearly across the housing, through a slot in the nut 9 and is pivotally fixed on its inner end to the lever or arm 7A at 7B to control the action of the clutch to which 7B is fixed, also to control the drilling operation.

The nut 9 is provided with a threaded axial bore for the reception of the threaded adjusting rod 18, fixed in a head 18A within the tube 19, so that when the drilling depth has been reached, it will function to pull the clutch lever down and hence the clutch into clutching position to return the drill chuck carrying member to its initial position by increasing the speed ratio between the hollow driven shaft and the guiding sleeve member.

The member 30A with head 30B is for manual use in adjusting the rod 18 which is secured or attached by means of 32A.

A further explanation of the action of the ratchet assembly is as follows:

14 and 14B are positioned in and on a "split" or divided, dog housing. The dog 14 is engaged with a tooth on ratchet wheel 13, while dog 14A is not engaged at the same time with a ratchet tooth, the distance of such disengagement being determined by 16, an adjusted screw, or cam, for enlarging or decreasing the size of the split in such housing, the varying of the width of such "split" regulates the downward speed of 29 by the momentarily stopping of 34, which permits 29 to thread itself down into tube 24.

While I have herein shown and described a preferred arrangement, it will be readily understood that changes and modifications therein may be found desirable or essential in meeting the various exigencies of use, and I desire to be understood as reserving the right to make any and all such changes or modifications as may be found desirable or essential, in so far as the same may fall within the spirit and scope of the invention as expressed in the accompanying claims when broadly construed.

Having described my invention and the manner of its operation, I claim:

1. A device of the class described comprising, in combination with a motor, a driving shaft, a driven shaft, the driven shaft being hollow, a gear train cooperating respectively with the driving shaft and the driven shaft, and with an internally threaded drill chuck guiding member, a ratchet fast on the upper end of the aforementioned drill chuck guiding member, means for intermittently rotating the drill chuck internally threaded guiding member, said means being operatively associated with the driven shaft, the ratchet member and the internally threaded drill chuck guiding member, an externally threaded drill chuck carrying member cooperating with the internally screwthreaded member, means associated with the driven shaft for screwing the externally threaded drill chuck carrying member down in the internally threaded drill chuck guiding member, means in the gear train brought into action by cooperating instrumentalities in the hollow driven shaft to impart a different speed ratio to gears in the train to return the externally threaded drill chuck carrying member to its initial position after a drilling operation.

2. A device of the class described comprising, in combination with a motor a driving shaft, a driven shaft, the driven shaft being hollow, a gear train cooperating respectively with the driving shaft and the driven shaft, and with an internally threaded drill chuck guiding member, a ratchet fast on the upper end portion of the aforementioned drill chuck guiding member, a means for intermittently permitting rotative movement of the drill chuck guiding member, said means being operatively associated with the drill chuck guiding member and ratchet dogs, a ratchet dog housing a portion of which is connected to the driven shaft, an externally threaded drill chuck carrying member cooperating with the internally threaded guiding member, means associated with the driven shaft and cooperating with the externally threaded drill chuck carrying member for screwing the externally threaded drill chuck carrying member down in the internally threaded drill chuck guiding member, means in the gear train automatically brought into action by cooperating instrumentalities in the hollow driven shaft and translating movement to means for increasing the rotative movement of the internally threaded drill chuck guiding member in excess of the driven shaft to return the drill chuck carrying member to its initial position after a drilling operation.

3. A device of the class described comprising, in combination with a motor a driving shaft, a driven shaft, the driven shaft being hollow, a gear train cooperating respectively with the driving shaft and the driven shaft, and with an internally threaded drill chuck guiding member, a ratchet fast on the upper end portion of the aforementioned drill chuck guiding member, an adjustable ratchet dog housing, ratchet dogs spring pressed mounted in the ratchet dog housing and cooperating with the ratchet fast on the upper end portion of the drill chuck guiding member on rotation of the driven shaft and intermittently advancing rotatively the drill chuck guiding member on the release of the ratchet dog, an externally threaded drill chuck carrying member cooperating with the internally screw threaded guiding member, transaxially fixed keys in the driven shaft slidable in key-ways in the externally threaded drill chuck carrying member to rotate the aforesaid member in a drilling direction, means in the driven shaft cooperating with manually settable means operatively associated with a clutch engaging means for effecting coupling of an "idling" gear in the train whereby a rotative movement is translated to the drill chuck guiding member in excess to that of the driven shaft to return the drill chuck carrying member to initial drilling position.

4. A device of the class described comprising, in combination with a motor, a gear train, a driving shaft, a driven shaft, the said shaft being hollow, and being axially non-movable in relation to an externally threaded drill chuck carrying member, an internally threaded drill chuck guiding member, a gear and a ratchet fast on the internally threaded drill chuck guiding member, a ratchet dog housing, ratchet dogs operatively associated with the ratchet dog housing, a portion of the ratchet dog housing fast on the driven shaft, means for intermittently releasing the said ratchet dogs to rotate the drill guiding member in drilling direction, and means in the gear train and cooperating therewith and actuated by the cooperation of means supported in the driven shaft which on engagement imparts a movement of translation to a lever mechanism acting in response thereto to return the drill chuck carrying member automatically to its initial drilling position.

5. A device of the class described comprising, in combination with a motor, a gear train, a driving shaft, a driven shaft, the said shaft being hollow, and being axially non-movable in relation to a rotatable externally threaded drill chuck carrying member, and an internally threaded drill chuck guiding member, a ratchet and a gear fast on the internally threaded rotatable drill chuck guiding member, an adjustable dog housing operatively associated with the driven shaft, ratchet dogs operatively associated with the ratchet dog housing and the ratchet, means for intermittently releasing the said dogs, the dogs adapted to rotate the drill chuck guiding member in drilling direction, and means cooperating with and acting responsive to a switching means adapted to release a clutch and restore an idle gear to inactivity when the drill chuck carrying member has reached its initial drilling position, and a manually controlled lever adapted to manually control the operation of the drilling device.

CARL L. BEST.

REFERENCES CITED

The following references are of record in the file of this patent:

UNITED STATES PATENTS

| Number | Name | Date |
|--------|------|------|
| 234,603 | Naish | Nov. 16, 1880 |
| 245,134 | Coburn | Aug. 2, 1881 |
| 2,470,044 | Mueller et al. | May 10, 1949 |